United States Patent Office 3,249,567
Patented May 3, 1966

3,249,567
BITUMEN-ETHYLENE COPOLYMER COMPOSITIONS
Richard E. Vigneault, Lake Jackson, Tex., assignor to The Dow Chemical Company, Midland, Mich., a corporation of Delaware
No Drawing. Filed June 8, 1962, Ser. No. 200,916
6 Claims. (Cl. 260—28.5)

This invention relates to new compositions of matter. More particularly, this invention relates to improved compositions of matter comprising bitumens and certain ethylene copolymers.

Bitumens have long been used for road surfacing, roofing materials, roofing sealant compounds, coatings for pipe, cable and wire, sealants for pipe joints and water repellent metal coating compounds. An important property of bitumens employed for the above uses is the penetration value. Penetration value is a measure of the hardness of the material and is an important characteristic of bitumens and particularly asphaltic compositions.

It is, therefore, among the objects of this invention to provide novel compositions of matter. A further object of the present invention is the provision of compositions of matter comprising bitumens and certain ethylene copolymers. A more particular object of the present invention is the provision of novel compositions of matter comprising asphaltic substances having improved penetration values.

These and other objects are attained in accordance with the practice of the present invention in compositions containing bitumens such as petroleum asphalt and a copolymer of ethylene with a lower alkyl ester of acrylic or methacrylic acid. By the term "lower alkyl," as used throughout this specification, is meant an alkyl group whether straight chain or branched having from 1 to 8 carbon atoms.

The bitumens which can be employed in the compositions of the present invention are preferably asphaltic in nature, especially obtainable from petroleum but may be obtainable from rock or other natural sources. Especially preferred are the petroleum asphalts of the aromatic type as distinguished from the naphthenic type. Commercially available asphalts of the aforementioned kinds are available in penetration values ranging from about 5 to 300 or more.

The ethylene copolymers as described above are copolymers of lower alkyl esters of acrylic or methacrylic acid, for example, methyl methacrylate, ethyl acrylate, ethyl methacrylate, butyl methacrylate, isobutyl acrylate and 2-ethylhexyl acrylate. The copolymers may be of the low, intermediate or high density types having melt indexes ranging from 0.01 or less up to 150 or more. The copolymers with ethylene may contain from as little as 2 or 3 percent of the alkyl esters up to about 50 percent thereof, preferably about 10 percent to 40 percent, especially 20 percent to 35 percent.

The materials employed to make the compositions of this invention can be combined by mixing or stirring them together by hand or by means of simple machinery such as external mixers, for example, a roll mill or internal mixers, for example, a Banbury mixer or a screw extruder. Alternatively, the constituents can be brought together by coprecipitation from a mutual solvent or can be melted together and mixed in fluid molten condition.

The invention is illustrated by the specific examples which follow, but is not limited to the details thereof. Throughout the specification, parts and percentages are parts and percentages by weight unless otherwise specified.

Example I

A mixture is prepared by hand stirring 70 parts by weight of molten asphalt with 30 parts by weight of a copolymer of ethylene with ethyl acrylate. The asphalt is an aromatic petroleum base material having a penetration value at 77° F. of 196 decimillimeters (ASTM D5-61), and a Brookfield viscosity at 165° C. of 60 centipoises. The copolymer contains 70 percent by weight ethylene and 30 percent by weight of ethyl acrylate, has a density of 0.9347, a melt index of 0.106, an ultimate tensile strength of 3,485 pounds per square inch (p.s.i.), a tensile yield strength of 640 p.s.i., an elongation of 710 percent and a modulus of elasticity of $0.35 \times 10^4$ p.s.i. The composition of this example has a penetration value of only 25 tenths of a millimeter.

Example II

A mixture of 50 parts of the asphalt employed in Example I and 50 parts of the copolymer employed in Example I is prepared on a roll mill. This composition has a penetration value of 1.3 millimeters, a melt index of 12.7, an elongation of 970 percent, a modulus of elasticity of $0.07 \times 10^4$ p.s.i. and a low temperature brittle point of minus 32° C.

Example III

The procedure of Example II is repeated using the materials there employed except that 30 parts of the asphalt are milled with 70 parts of the ethylene/ethyl acrylate copolymer. The composition of this example has a penetration value of 9 decimillimeters, a melt index of 7.50, an ultimate tensile strength of 2,890 p.s.i., an elongation of 860 percent, a modulus of elasticity of 0.15 p.s.i., a low temperature brittle point below minus 70° C. and a Vicat softening point of 102° F.

Example IV

The procedure of Example III is repeated using the same materials except that 15 parts of asphalt are roll milled with 85 parts of the copolymer. This composition has a penetration value at 77° F. of 6 decimillimeters, an ultimate tensile strength of 3,260 p.s.i., a tensile yield strength of 425 p.s.i., an elongation of 800 percent, a modulus of elasticity of $0.24 \times 10^4$ p.s.i., a low temperature brittle point of less than minus 70° C. and a Vicat softening point of 103° F.

Example V

The materials of Example I are processed in accordance with the procedure set forth therein except that 80 parts of the asphalt are stired with 20 parts of the copolymer. As composition according to this invention is obtained having a penetration value of 33 decimillimeters.

Examples VI and VII

The procedure and materials of Example V are employed. In Example VI, 90 parts of asphalt and 10 parts of the copolymer are employed to produce a composition having a penetration value of 59 decimillimeters and in Example VII, 95 parts of the asphalt are stirred with 5 parts of the copolymer to produce a composition having a penetration value of 102 decimillimeters.

Example VIII

A mixture is prepared by hand stirring 95 parts by weight of asphalt with 5 parts by weight of a copolymer of ethylene with isobutyl acrylate. The asphalt is an aromatic petroleum base material having a penetration value at 77° F. of 19.6 millimeters obtained according to the American Society for Testing Materials, Test No. D5-61, and a Brookfield viscosity at 145° C. of 104 centipoises. The copolymer contains 75 percent by weight of ethylene and 25 percent by weight of isobutyl acrylate, and has a density of 0.9235 gram per cubic centimeter and a melt index of 2.64. The copolymer has an ultimate tensile strength of 2,135 p.s.i., a tensile yield strength of 640 p.s.i., an elongation of 785 percent and a modulus of elasticity of $0.34 \times 10^4$ p.s.i. The composition made in accordance with this Example has a penetration value of only 9.6 millimeters.

*Examples IX, X and XI*

Compositions are made utilizing the materials and procedure of Example VIII. In Example IX, 90 parts of the asphalt are stirred with 10 parts of the copolymer producing a composition having a penetration value of 5.9 millimeters. In Example X, 80 parts of asphalt are hand stirred with 20 parts of the isobutyl acrylate copolymer to produce a composition having a penetration value of 3.1 millimeters. In Example XI, 70 parts of asphalt are blended with 30 parts of the copolymer in accordance with this invention to produce a composition having a penetration value of 2.6 millimeters and an elongation of 480 percent.

*Example XIII*

Fifty parts of the asphalt employed in Example VIII are roll milled with 50 parts of an ethylene isobutyl acrylate copolymer having the properties of this polymer given in Example VIII to obtain a blend having a penetration value of 1.5 millimeters, a melt index of 75.7, an elongation of 1,050 percent, a modulus of elasticity of $0.80 \times 10^4$ p.s.i. and a low temperature brittle point of minus 34° C.

*Examples XIII and XIV*

Compositions are made in accordance with this invention following the procedure of Example XII and using the materials set forth therein except that in Example XIII, 30 parts of the asphalt are milled with 70 parts of the copolymer to produce a composition having a penetration value of 1.0 millimeter, a melt index of 16.1, an elongation of 965 percent, a modulus of elasticity of $0.17 \times 10^4$ p.s.i., a low temperature brittle point of minus 52° C. and a Vicat softening point of 96° F. In Example XIV, 15 parts of asphalt are blended with 85 parts of the copolymer to produce a composition having a penetration value of 7 decimillimeters, a melt index of 6.7, an ultimate tensile strength of 1,525 p.s.i., a tensile yield strength of 420 p.s.i., an elongation of 850 percent, a modulus of elasticity of $0.24 \times 10^4$ p.s.i., a low temperature brittle point of less than minus 70° C. and a Vicat softening point of 98° C.

In a manner similar to the foregoing examples, the physical and chemical properties of asphaltic materials, particularly of the aromatic type from many sources, can be improved by admixture with ethylene copolymers as hereinabove indicated, for example, by admixture with a copolymer of 90 percent ethylene and 10 percent methyl methacrylate, 80 percent ethylene and 20 percent 2-ethylhexyl acrylate and so forth.

The compositions of this invention have many other uses in addition to those given above. For example, they may be used in the joints between the sections of a concrete highway and in the potting of electrical materials. These compositions unexpectedly have improved properties in respects other than indicated above. For example, brittleness is not increased even though the penetration number is lowered, that is, the flexibility of the composition is improved by the copolymer addition. The compositions have improved resistance to weathering and particularly to degradation by ultraviolet radiation. The adhesion of the asphaltic materials to substrates, for example, concrete, metals, wood and plastics, is substantially improved.

The compositions of this invention may be used in binary form or can contain various other additives such as plasticizers and coloring agents, and fillers such as sand, gravel, crushed stone, asbestos and the like.

That which is claimed is:

1. An asphaltic composition comprising about 5 to about 95 percent by weight of an aromatic base petroleum asphalt and about 5 to about 95 percent by weight of a copolymer of ethylene with from about 10 percent to about 40 percent by weight based on the weight of the copolymer of an alkyl ester of an acid selected from the group consisting of acrylic acid and methylacrylic acid, the alkyl gorup of said ester containing from 1 to 8 carbon atoms.

2. The composition of claim 1 wherein the copolymer contains about 20 to about 35 percent by weight based on the copolymer of the alkyl ester.

3. The composition of claim 1 wherein the acid is acrylic acid.

4. The composition of claim 1 wherein the acid is methacrylic acid.

5. The composition of claim 1 wherein the ester is ethyl acrylate.

6. The composition of claim 1 wherein the ester is isobutyl acrylate.

References Cited by the Examiner

UNITED STATES PATENTS

| | | | |
|---|---|---|---|
| 2,420,082 | 5/1947 | Klinger | 260—28.5 |
| 2,610,956 | 9/1952 | Derksen | 260—28.5 |
| 2,834,742 | 5/1958 | Scott et al. | 260—28.5 |
| 2,909,498 | 10/1959 | Sayko | 260—28.5 |
| 2,953,541 | 9/1960 | Pecha et al. | 260—45.5 |

OTHER REFERENCES

Abraham: Asphalts and Allied Substances, D. Van Nostrand Co., Inc., N.Y., chapter 1, page 14, April 1962, vol. III.

MORRIS LIEBMAN, *Primary Examiner.*

D. C. KOLASCH, B. A. AMERNICK,
*Assistant Examiners.*